United States Patent [19]

Le Cardonnel

[11] 4,202,025
[45] May 6, 1980

[54] A CIRCUIT FOR PROTECTING AN ELECTRONIC EXCHANGE AGAINST OVERLOADS

[75] Inventor: Gérard Le Cardonnel, Paris, France

[73] Assignee: Thomson-CSF, Paris, France

[21] Appl. No.: 685,389

[22] Filed: May 11, 1976

[30] Foreign Application Priority Data

May 16, 1975 [FR] France .................. 75 15435

[51] Int. Cl.² .............................................. H02H 5/04
[52] U.S. Cl. .................................. 361/103; 307/310; 307/317 R; 370/53
[58] Field of Search ............... 317/40 R, 41, 132, 131, 317/133.5, 138, 147; 307/310, 322, 317 R; 340/227 D, 228 R; 357/28, 51 C; 179/184, 15 AT, 15 BF; 324/106; 73/262 SC; 361/103–106, 161, 165

[56] References Cited

U.S. PATENT DOCUMENTS

| 2,912,557 | 11/1959 | Michaelis | 317/132 X |
| 2,976,368 | 3/1961 | Gray | 361/165 X |
| 3,042,837 | 7/1962 | Alley et al. | 317/132 X |
| 3,083,319 | 3/1963 | Tiemann | 317/41 X |
| 3,181,364 | 5/1965 | Barton | 340/227 D |
| 3,182,201 | 5/1965 | Sklar | 317/132 |
| 3,321,641 | 5/1967 | Howell | 361/165 X |
| 3,379,939 | 4/1968 | Obenhaus | 361/165 X |
| 3,703,651 | 11/1972 | Blowers | 307/310 |
| 3,835,458 | 9/1974 | Mrazek | 307/310 X |
| 3,863,033 | 1/1975 | Chen et al. | 179/15 AT X |
| 3,914,559 | 10/1975 | Knollman | 179/15 AT X |
| 3,916,263 | 10/1975 | Abbott | 317/40 R |
| 3,927,571 | 12/1975 | Athey | 340/228 R X |

FOREIGN PATENT DOCUMENTS 749442 5/1956 United Kingdom .
1302235 1/1973 United Kingdom .

Primary Examiner—Patrick R. Salce
Attorney, Agent, or Firm—Cushman, Darby & Cushman

[57] ABSTRACT

The invention relates to methods for protecting exchanges against overloads. It comprises introducing into an exchange elements which detect increases in temperature and supply numerical signals. The central control unit of the exchange receives these signals and formulates procedures for counteracting the overloads.

1 Claim, 2 Drawing Figures

A CIRCUIT FOR PROTECTING AN ELECTRONIC EXCHANGE AGAINST OVERLOADS

This invention relates to methods for protecting an exchange against overloads. Methods such as these enable those parts of the exchange subjected to overloads to be detected and isolated.

The elements which make up exchanges use little electrical energy per unit, but an exchange combines such a large number of these elements that the consumption of the complex as a whole becomes very significant. Most of this energy is dissipated into heat and the hardware has to be designed in such a way as to enable it to be dissipated. The design work has to allow in particular for traffic peaks, which may be very high, and external overloads on the subscriber lines such as, for example, short circuits or the accidental connection of these lines to the mains. Design factors such as these are at variance with the advantages of compactness which it might be hoped to derive from the miniaturisation of modern exchanges these advantages being obtained in particular by the introduction of electronic switching techniques.

Hitherto, it has only been possible to make allowance for the most serious overloads by placing fuses in the most exposed circuits, for example the line circuits. Unfortunately, this solution does not enable the size of the elements to be reduced to any significant extent and is not applicable to all the elements of an exchange.

In accordance with the present invention a method for protecting an electronic exchange against overloads is provided, said exchange comprising a central control unit and a plurality of frail elements, at least one of said frail elements being capable of being overheated during one of said overloads, said method comprising:

placing onto each of said frail elements detector means for detecting the overheating, said detector means emitting logical signals;

collecting said logical signals into said central control unit;

interpreting said logical signals in said central control unit for locating at least one overloaded element; and emitting from said central control unit signals for controlling means for limitting the load of said overloaded element.

For a better understanding of the invention, and to show how the same may be carried into effect, reference will be made to the ensuing descriptions and to the attached figures among which:

Figure 1:
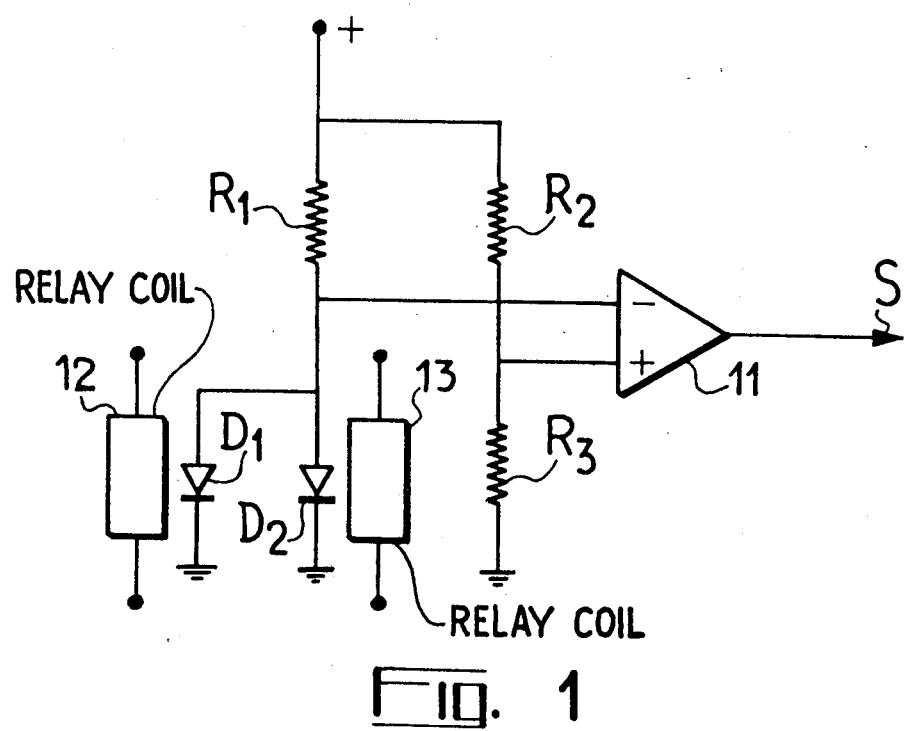
FIG. 1 illustrates a circuit diagram of a temperature detector.

The temperature detector illustrated in FIG. 1 comprises two resistors $R_1$ and $R_2$ connected to the positive terminal of a direct-current source, a resistor $R_3$ and two diodes $D_1$ and $D_2$ connected to the earth of this source, a comparator 11 and two elements 12 and 13 to be monitored, these elements being for example relay coils.

The diodes $D_1$ and $D_2$ are arranged in close contact with the elements 12 and 13 to be monitored. In certain cases, the diodes may even be incorporated in the elements to improve this contact, for example by forming a separate diode reserved for this purpose on the substrate of a semiconductor device.

The comparator circuit 11 is a circuit which as its output S has logic states with two levels of the kind used in numerical circuits. One of these levels corresponds to a positive voltage difference between the positive and negative inputs, whilst the other level corresponds to a negative voltage difference between those inputs. It is essential that the switching between these two levels should always take place when this voltage difference disappears, irrespective of the common value of these voltages (minimal influence of the common mode), and irrespective of the direction of the alternation (no hysteresis). Circuits which quite well satisfy these requirements are available.

When the temperature of at least one of the elements 12 and 13 increases, the conduction threshold of the corresponding diode, which is heated by that element, drops and the voltage in the connection between the resistance $R_1$ and the anode of the diode decreases. When this voltage becomes lower than the constant voltage supplied by the divider bridge formed by the resistances $R_2$ and $R_3$, the comparator circuit 11 switches and the logic state of its output S changes.

It is entirely possible to connect several diodes (two in the drawing) in parallel, because switching takes place when the threshold of at least one of the diodes becomes sufficiently low, the other diode then being substantially non-conductive, which is of no significance. This threshold voltage is a characteristic of the semiconductor material used for the manufacture of the diodes (approximately 0.7 V for the normal case of silicon) and the degree of dispersion is very low between the diodes of one and the same type. It is thus possible to gather the alarms emanating from overloaded circuits which need not be distinguished from one another, which is equivalent to directly performing an OR function at the overload detection level.

Figure 2:
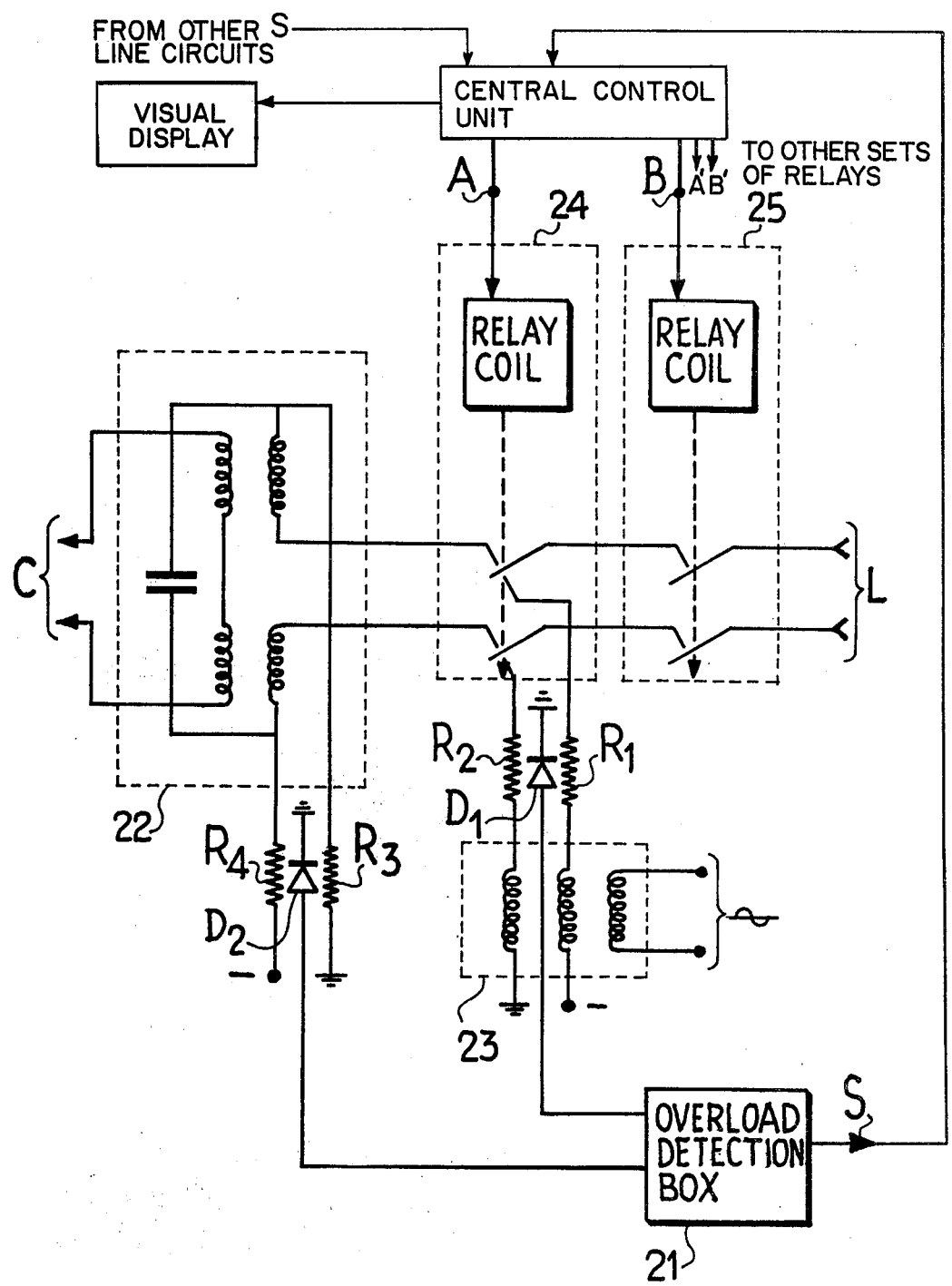
FIG. 2 illustrates a circuit diagram of a line circuit equipped with such a detector.

The line circuit diagrammatically illustrated in FIG. 2 comprises 4 current limiting resistances $R_1$, $R_2$, $R_3$ and $R_4$, two diodes $D_1$ and $D_2$ for detecting increases in temperature, an overload detection box 21, a line transformer 22, a call transformer 23, a call relay 24 and an isolation relay 25.

This line circuit is connected on the one hand to a subscriber by a line terminating at the input L and, on the other hand, to the switching circuits of the exchange through its output C.

The subscriber line is fed with direct current from a power supply of which the positive terminal is connected to earth by way of resistances $R_3$ and $R_4$. In the event of a call, the relay 24 receives at its control input A a signal coming from the central unit of the exchange. This signal causes the relay 24 to switch so that the line receives the alternating call current supplied by the transformer 23. The line is supplied with direct current during this call from the same supply by the resistances $R_1$ and $R_2$.

In the event of a trouble causing the line to be overloaded, for example a short circuit, the resistances $R_4$ and $R_3$ or, if the call position is maintained, the resistances $R_1$ and $R_2$ become heated. The conduction threshold of the diode $D_2$ (heated by $R_3$ and $R_4$) or of the diode $D_1$ (heated by $R_1$ and $R_2$) drops because these diodes are in close contact with the corresponding resistances. The overload detection box 21, which with the diodes $D_1$ and $D_2$ forms a circuit of which the plan is similar to that shown in FIG. 1, emits a signal corresponding to a change of logic state at its output S for a predetermined temperature value of the resistances. For example, the state of S changes from 0 to 1, i.e. from a substantially zero voltage to a voltage substantially equal to the feed voltage of the box 21.

All the outputs S of all the line circuits of the exchange are multiplexed. This multiplexing takes the form of a sequence of bits, some of which perform a synchronising function whilst the others are used for indicating the state of the output S. For example, this sequence may be organised in the form of several PCM frames. The central unit of the exchange thus detects the change in state of S and sends a control signal to the input B of the relay 25. This relay switches and isolates the line, thus protecting at least the line circuit.

Simultaneously the central unit indicates in visual form at the level of the control console, by printing a message on a teleprinter for example, the fact that the subscriber corresponding to this circuit has been disconnected. In the case of an exchange where the operating personnel are not permanently present, this visual indication may be removed to any useful place.

Certain elements of the exchange are used for a large number of simultaneous calls and producing them by means of the so-called large scale integration (LSI) technique has been considered. Thus, a multiplexer used in a space-division switching stage and capable of switching more than 100 calls may be made in the form of a single integrated circuit on a silicon substrate with a surface area of a few square millimetres. The failure of an element such as this would have serious consequences. The method according to the invention enables the temperature of this circuit to be monitored at any moment and, in the event of abnormal increases in that temperature, enables corrective measures to be taken. To this end, when the circuit is being produced at least one additional diode is integrated on the substrate, which does not involve any difficulties. It is thus easy to monitor the threshold voltage of this diode and to introduce the result of monitoring into a telemeasuring frame by the method referred to earlier on. The central unit of the exchange is thus able to take the appropriate measures in the event of abnormal increases in this temperature and, for example, momentarily reduces the traffic passing although that circuit or replaces it by a circuit held in reserve.

Although every effort is made to minimise their number, it is still necessary to use electromagnetic relays in an exchange. When the main functions of an exchange are performed by electronic elements, the dimensions of these relays become excessive in relation to the dimensions of these elements. In order to be able to reduce the volume of these relays without at the same time risking excessive heating, it is advisable to apply the method according to the invention by placing a measuring diode of the kind in question inside the actual winding of the relay, which enables any overheating of that relay to be detected without delay.

What I claim is:

1. A telephone line circuit protected against overloads, said circuit comprising:

a line transformer for isolating a subscriber line from an exchange;

a call relay for switching said subscriber line from said line transformer to a call transformer under the control of an external call signal;

an isolating relay for disconnecting said subscriber line from said line circuit under the control of an external switching signal;

normal resistors connected to said line transformer for feeding said subscriber line with direct current during normal operation;

call resistors connected between said call transformer and said call relay for feeding said subscriber line with direct current during calling;

at least one normal diode in close contact with at least one of said normal resistors;

at least one call diode in close contact with at least one of said call resistors; and a circuit for forward biasing said normal and call diodes, monitoring the bias of said normal and call diodes, and emitting on an output connection a logical signal when said bias rises to a predetermined value.

* * * * *